United States Patent Office 2,806,366
Patented Sept. 17, 1957

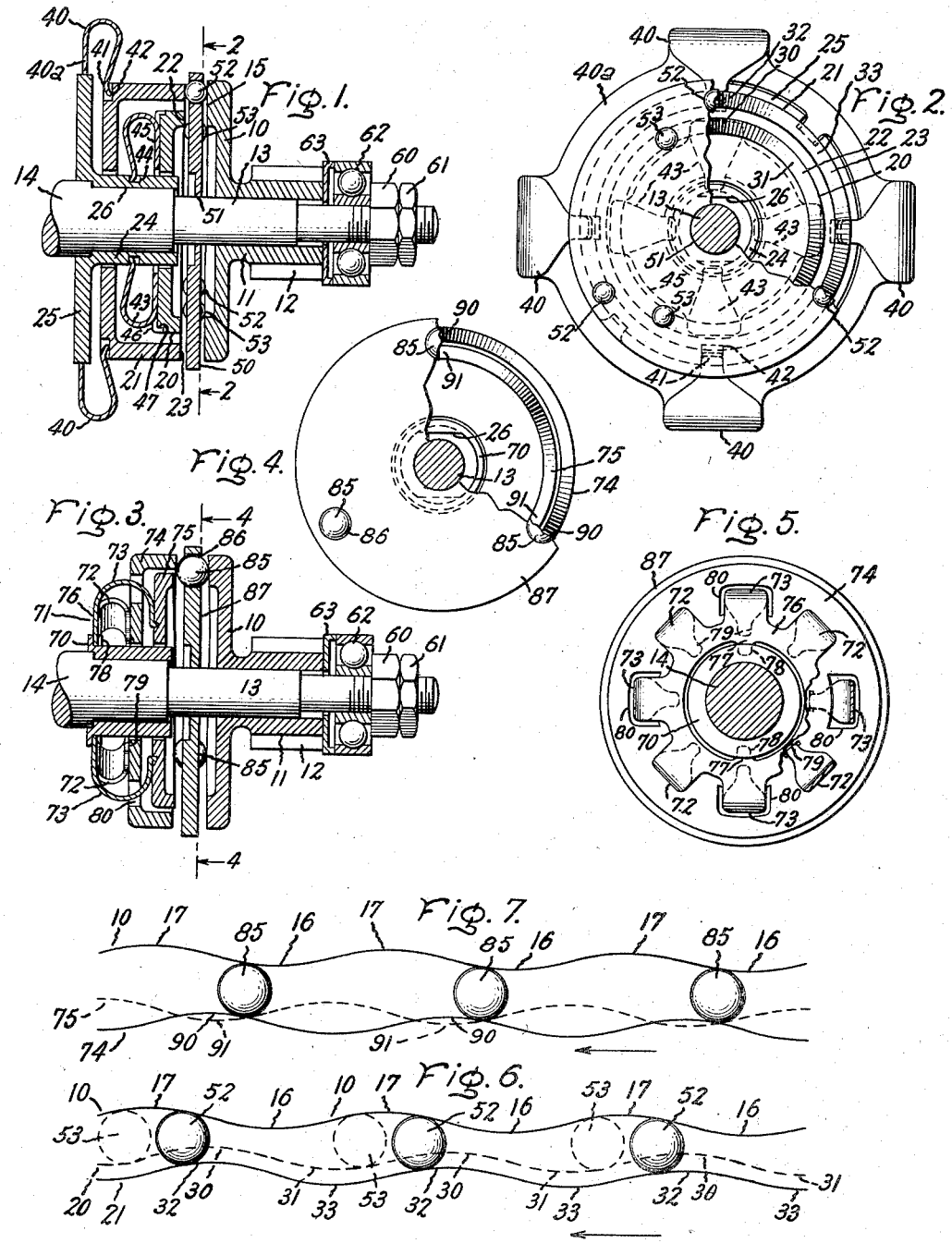

2,806,366

SLIPPING CLUTCH HAVING WAVELIKE CONTOURS ON THE CLUTCH FACES

Francis Bamford Woestemeyer, Schenectady, N. Y., assignor to General Electric Company, a corporation of New York Application August 25, 1954, Serial No. 452,037

8 Claims. (Cl. 64—29)

This invention relates to a slipping clutch which will slip upon reaching a predetermined torque, and more particularly to slipping clutches provided with clutch faces having wavelike contours between which are guided rollers, such as described and claimed in a copending application of Edwin W. Barnes and Albert L. Hardy for "Slipping Clutch," filed November 8, 1954, Serial Number 467,323, and assigned to the assignee of the present invention, of which this invention is an improvement.

The slipping clutch of this invention is particularly useful with a reversible motor driving a load which frequently encounters a mechanical stop, whereupon considerable slippage of the clutch may occur before the direction of rotation of the motor is reversed. In the structure of the aforesaid Barnes application, slippage is provided for with a minimum amount of heat generation and wear between the clutch surfaces.

However, it has been found that in some uses of the clutch discussed in said Barnes application which clutch does not include differential gearing or other orientation maintaining means, there is a tendency for the rollers to creep relative to the maximum torque transmitting position between the driving member and the driven member. This creepage is due to the fact that there must be some permissible error in the machining of the faces of the clutch members and therefore perfectly symmetrical contours are not always produced, and also because experience has shown that deflections in the surfaces in contact produce an effect that is equivalent to slippage of the rollers relative to the driving members. This creepage is objectionable because it results in a change in the limiting torque, or that torque which is the predetermined setting of the clutch. An important object, then, of this invention is to provide a clutch which will slip with a minimum amount of heat and wear, and which will accurately maintain a predetermined torque setting through periods of continuous slipping and through reversible operation of the clutch, even though creepage may occur.

Briefly stated, in accordance with one aspect of this invention, a clutch is provided having a driven member and a plurality of driving members, the opposing faces of each of these members having similar wavelike contours including hills and valleys thereon. The driving members are arranged so that their faces lie in substantially the same plane. Guided rollers are adapted to contact the driven member face and the face of at least one of the driving members. Means are provided for applying a predetermined force independently to each of the driving members for urging the members together into contact with the rollers. The clutch is so constructed and arranged that there is relative angular displacement between the guided rollers and the contours on the faces of the driving members, such displacement being effective to provide that when one driving member and its cooperating rollers are oriented so as to transmit maximum torque, the other driving member and its cooperating rollers will be oriented so as to transmit minimum torque. Then, when creepage occurs the torque transmitted by the second driving member and its cooperating rollers will increase as the torque transmitted by the first driving member and its cooperating rollers decreases, the sum of the two torques being relatively constant. Thus, at a predetermined torque transmitted between the clutch members, the force of the rollers acting to separate the members will become greater than the predetermined force applied, and the rollers will roll on the faces, permitting continuous slipping of the clutch, the predetermined torque setting of the clutch being accurately maintained regardless of any roller creepage.

The invention will be better understood from the following description and the accompanying drawing, and its scope will be pointed out in the appended claims.

In the drawing,

Fig. 1 is a cross-section of a clutch illustrating one embodiment of this invention.

Fig. 2 is a view taken along the line 2—2 of Fig. 1.

Fig. 3 is a cross-section of a clutch illustrating a second embodiment of this invention.

Fig. 4 is a view taken along the line 4—4 of Fig. 3.

Fig. 5 is a side view looking from the spring side of the clutch of Fig. 3.

Fig. 6 is a diagrammatic sketch illustrating the relationship between the clutch member faces and the rollers of the clutch shown in Figs. 1 and 2.

Fig. 7 is a diagrammatic sketch illustrating the relationship between the clutch member faces and the rollers of the clutch illustrated in Figs. 3, 4, and 5.

Referring more particularly to Figs. 1, 2 and 6 of the drawing, a slipping clutch is provided having a rotatable driven member 10 in the form of a disk having a hub portion 11, on which is formed a pinion 12 adapting the driven member for connection to a load. The driven member 10 is rotatably supported by a portion 13 of a main drive shaft 14. The driven member 10 has an annular face 15 with wavelike contours including hills 16 and valleys 17 thereon.

A plurality of rotatable axially-movable driving members are provided. In the embodiment illustrated in Fig. 1, these members are an inner driving member 20 and an outer driving member 21, each member being cup-shaped and having faces 22 and 23 thereon. The driving members 20 and 21 have central bores therethrough which are slightly larger in diameter than the outside diameter of the supporting hub 24 of a spring retainer 25, adapting the driving members to be axially movable. The spring retainer 25 is an annular member surrounding the shaft 14, and is secured to rotate with the shaft 14 by cooperation between flat portions 26 in the interior of the hub 24 and similar flat portions of the shaft 14. The wave-like contours preferably sinusoidal, on the faces 22 and 23 are similar to the contours of the driven member face 15, and also include hills and valleys, the hills and valleys on the inner driving member 20 being designated by the numerals 30 and 31 (Figs. 2 and 6) respectively, and the hills and valleys on the outer driving member 21 being designated as 32 and 33 respectively. It will be noted that the driving members 20 and 21 are arranged on the hub 24 so that their annular faces 22 and 23 lie in substantially the same plane, i. e. a vertical plane perpendicular to the plane of the drawing as seen in Figs. 1 and 3.

A plurality of guided rollers are disposed between the driving members and the driven member, each of the rollers being adapted to engage the face of the driven member and the face of at least one of the driving members described above. In Fig. 1 embodiment, these rollers comprise two sets of concentrically arranged balls carried in bearing holes within a cage 50. This cage 50 is freely rotatable about the portion 13 of the driving shaft 14, the central bore 51 in the cage being of slightly larger diameter than the outside diameter of the portion 13 of the shaft. The outer row of rollers or balls 52 is so oriented with respect to the inner row of balls 53 that when the rollers 52 are in contact with the hills on their cooperating driving member 21, the rollers 53 will be in contact with the valleys on the faces of the driving member 20. Thus, in the Fig. 1 embodiment, the driving members 20 and 21 are oriented so that their respective hills and valleys are in phase with each other, and therefore the concentric sets of rollers are oriented out of phase with each other, preferably as shown in Fig. 2 and also in Fig. 6. Fig. 6 shows the maximum torque transmitting position.

Means are provided for applying a predetermined force for independently urging each of the driving members toward the driven member, to maintain contact between the rollers and the clutch members. In the embodiment illustrated, such means are in the form of springs and these springs also serve to transmit torque between the driving shaft 14 and the respective driving members. In the Fig. 1 embodiment, U-shaped spring arms 40 project outwardly from an annular disk 40a secured to the spring retainer 25, and have extending fingers 41 fitted within slots 42 in the driving member 21, to urge it toward the driven member 10. Similar springs 43 seat within slots 44 in the spring retainer hub 24 and have an annular disk portion 45 bearing against driving member 20, urging it in the direction of the driven member 10. The annular disk portion 45 is keyed to the driving member 20 by its fingers 46 extending to cooperate with mating slots 47 formed in the driving member 20. Thus, it will be seen that rotation of the driving shaft 14 and the spring retainer 25 causes rotation of the springs 40 and 43 and also rotation of the driving members 20 and 21, as a unit.

Adjustable stop means are provided for preventing axial movement of the driven member away from the guided rollers. This means in the disclosed embodiments of this invention is in the form of take-up nuts 60 and 61 which cooperate with the threaded end of the shaft 14 to limit axial movement of the driven member 10. A ball thrust bearing 62, having a spacer 63 between it and the pinion 12, surrounds the shaft and serves to take up axial thrust and allow rotation of the driven member. The initial torque setting of the clutch may thus be adjusted by rotating the nuts 60 and 61 to vary the force with which the springs 40 and 43 act against the driving members 20 and 21.

In the operation of the embodiment shown in Figs. 1, 2 and 6, torque is transmitted from the driving members 20 and 21 through the guided rollers 52 and 53. The breakaway torque, or the torque at which the clutch is set to slip, will be the sum of the torques transmitted through the two sets of concentric rollers. In the event of any slippage of the rollers on the faces of the clutch members, the torque transmitted by one set of rollers will increase as that transmitted by the other set of rollers decreases, the resulting breakaway torque will be practically constant, regardless of the slippage or creepage. The reason for this type of torque transmission will be understood by referring to Fig. 6, where it is seen that the contours of the driving members 20 and 21 are oriented so that their hills and valleys are in phase. The concentric sets of guided rollers, however, are oriented so that the rollers are out of phase with each other, the preferred displacement being 90°. Thus, as the rollers of one set are engaging contours on their driving member and on the driven member so as to cause transmission of maximum torque, the rollers of the other set are engaging contours on their driving member and on the driven member so as to cause transmission of minimum torque.

In the alternative embodiment shown in Figs. 3, 4, 5 and 7, several of the clutch elements are the same as those illustrated in the first embodiment disclosed, and such elements have been given corresponding numbers in Figs. 3, 4 and 5. In this embodiment, torque is transmitted from the spring retainer 70 through a spring member 71, and spring arms 72 and 73, to the clutch driving members 74 and 75, respectively. The spring member 71 comprises a central disk 76 fixed to rotate with the spring retainer 70 by projections 77 fitting within slots 78 of the retainer 70 and has spring arms 72 and 73 extending outwardly from the disk 76. The arms 72 bear against the driving member 74 and are attached thereto by fingers 79 fitting within mating slots within the driving member 74. The spring arms 73 extend through cutouts 80 in the driving member 74 to bear against the driving member 75.

In the Fig. 3 embodiment, only one set of guided rollers 85 is used, and these rollers are carried within bearing holes 86 in a cage 87 which is mounted for rotation about the shaft 14 in a manner similar to that described in connection with the cage 50 in Fig. 1. The driving members 74 and 75 are so arranged with respect to each other that their hills and valleys are out of phase. Thus, when the rollers 85 are in contact with the hills 90 of the driving member 74, they are at the same time in contact with the valleys 91 of the driving member 75.

In the operation of the Fig. 3 embodiment, the torque transmitted by the driving members 74 and 75 will be additive, and since the torque transmitted by one member increases as that transmitted by the other member decreases, therefore the resulting breakaway torque or slipping torque will be practically constant, regardless of any creepage between the driving member faces and the guided rollers.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of my invention.

What is claimed as new and is desired to be secured by Letters Patent of the United States is:

1. A slipping clutch comprising a rotatable driven member adapted for connection to a load and having an annular face with wavelike contours including hills and valleys thereon; a plurality of rotatable axially movable driving members, each having an annular face and wavelike contours on the face, said contours being similar to those on the driven member face and also including hills and valleys; a plurality of guided rollers disposed between the driving members and the driven member, each of said rollers being adapted to engage the face of the driven member and the face of at least one of said driving members; and means for applying a predetermined force to each of said driving members for independently urging each of said driving members toward said driven member to maintain contact between said rollers and said clutch members; the clutch being so constructed and arranged that there is relative angular displacement between the guided rollers and the contours on the faces of said axially movable driving members, such angular displacement being effective to provide that when one of said driving members transmits maximum torque and the other of said driving members transmits minimum torque so as to maintain a predetermined torque setting regardless of clutch creepage.

2. A slipping clutch as set forth in claim 1, in which said means for applying a predetermined force to each of said driving members includes means for varying the magnitude of said predetermined force.

3. A slipping clutch as set forth in claim 2, said last-named means including an adjustable stop cooperating with the driven member to prevent it from moving axially away from said axially movable members.

4. A slipping clutch comprising a drive shaft, a first axially movable driving member having an annular face with wavelike contours including hills and valleys thereon, a second axially movable driving member having an annular face with contours thereon similar to those on the first member, said first and second members being mounted for rotation with the shaft, a driven member rotatably mounted on said shaft and adapted for connection to a load, said driven member having an annular face with wavelike contours thereon similar to those on said axially movable members, a plurality of guided rollers disposed between the driven member and said axially movable members, said rollers adapted to engage the face of said driven member and the face of at least one of said axially movable members, means for applying a predetermined force to each of said axially movable members for independently urging it toward the driven member, and means for providing relative angular displacement between the guided rollers and the contours on the faces of said axially movable driving members through periods of continuous slipping of the clutch, such angular displacement being effective to provide that when one of said driving members transmits maximum torque, the other of said driving members transmits minimum torque so that the sum of the two torques is relatively constant at all operating conditions.

5. A slipping clutch comprising a rotatable driven member adapted for connection to a load and having an annular face with wavelike contours including hills and valleys thereon; a pair of rotatable axially movable driving members, each having an annular face and wavelike contours on the face, said contours being similar to those on the driven member face and also including hills and valleys, and one of said driving members having its face disposed outwardly of the face of the other driving member; two concentrically arranged sets of guided rollers disposed between the driving members and the driven member, the outer set of rollers being adapted to engage the face of the outer one of said driving members and the inner set of rollers being adapted to engage the face of the inner one of said driving members; and means for applying a predetermined force for independently urging each of said driving members toward the driven member; the clutch being so constructed and arranged that there is relative angular displacement between the two sets of guided rollers and the contours on the faces of said axially movable driving members, such angular displacement being effective to provide that when one of said driving members transmits maximum torque, the other of said driving members transmits minimum torque.

6. A slipping clutch comprising a rotatable driven member adapted for connection to a load and having an annular face with wavelike contours including hills and valleys thereon; a pair of rotatable axially movable driving members, each having an annular face and wavelike contours on the face, said contours being similar to those on the driven member face and also including hills and valleys, an annular set of guided rollers disposed between the driving members and the driven member, each of said rollers being adapted to engage the face of the driven member and the faces of both of said driving members; means for independently applying a predetermined force for urging each of said driving members toward said driven member; means for orienting said driving members so that their contours are oriented out of phase and when one driving member transmits maximum torque, the other driving member transmits minimum torque.

7. A slipping clutch comprising a driving structure and a driven structure; one of said structures including a single rotatable member having an annular face with wavelike contours including hills and valleys thereon, and the other of said structures including a plurality of rotatable members each being axially movable in either direction and each having an annular face with wavelike contours on the face, said contours being similar to those on the single member face and also including hills and valleys; said axially movable members being arranged so that their annular faces lie in substantially the same plane; a plurality of guided rollers disposed between the single member and the axially movable members, each of said rollers being adapted to engage the face of the single member and the face of at least one of said axially movable members; and means for applying a predetermined force for independently urging each of said axially movable members toward said single member to maintain contact between said rollers and said members; the clutch being so constructed and arranged that there is relative angular displacement between the guided rollers and the contours on the faces of said axially movable members, such angular displacement being effective to provide that when one of said axially movable members transmits maximum torque, the other transmits minimum torque.

8. A slipping clutch comprising a rotatable driven member adapted for connection to a load and having an annular face with wavelike contours including hills and valleys thereon; a plurality of rotatable axially movable driving members, each having an annular face and wavelike contours on the face, said contours being similar to those on the driven member face and also including hills and valleys; a plurality of guided rollers disposed between the driving members and the driven member, each of said rollers being adapted to engage the face of the driven member and the face of at least one of said driving members; means for applying a predetermined force to each of said driving members for independently urging each of said driving members toward said driven member to maintain contact between said rollers and said clutch members; and means for providing relative angular displacement between the guided rollers and the contours on the faces of said axially movable driving members, such angular displacement being effective to provide that when one of said driving members transmits maximum torque, the other of said driving members transmits minimum torque so as to maintain a predetermined torque setting through periods of continuous slipping between the driving and driven members.

References Cited in the file of this patent

UNITED STATES PATENTS 1,518,634    Cason                  Dec. 9, 1924

FOREIGN PATENTS 134,154     Switzerland            Sept. 16, 1929